United States Patent [19]
Duling, III et al.

[11] Patent Number: 5,959,753
[45] Date of Patent: *Sep. 28, 1999

[54] ULTRA HIGH BIT RATE ALL OPTICAL COMMUNICATION SYSTEM

[75] Inventors: Irl N. Duling, III, Round Hill; Ronald D. Esman, Burke, both of Va.

[73] Assignee: The United States of America as represented by the Secretary of the Navy, Washington, D.C.

[*] Notice: This patent is subject to a terminal disclaimer.

[21] Appl. No.: 08/186,074

[22] Filed: Jan. 25, 1994

[51] Int. Cl.⁶ .................................................. H04B 10/02
[52] U.S. Cl. .......................... 359/158; 359/179; 359/139
[58] Field of Search .................... 359/108, 138, 359/139, 158, 174, 173, 176, 179; 385/15; 372/94

[56] References Cited

U.S. PATENT DOCUMENTS

| | | | |
|---|---|---|---|
| 5,050,183 | 9/1991 | Daling, III | 372/94 |
| 5,309,267 | 5/1994 | Huang | 359/176 |
| 5,329,393 | 7/1994 | Huang | 359/135 |
| 5,369,520 | 11/1994 | Avramopoulos et al. | 359/176 |
| 5,408,351 | 4/1995 | Huang | 359/186 |

OTHER PUBLICATIONS

Jinno et al, Nonlinear Sagnac Interferometer Switch and Its Applications, 1992 IEEE pp. 875–881.

Jinno, All optical signal regularizing/regeneration using a nonlinear fiber sagnac interferometer switch with signal–clock walk–off, 1994 IEEE.

Lucek et al, All optical signal regenerator, Aug. 1 1993, Optics Letters vol. 18, No. 15.

Irl N. Duling III, "All–fiber ring soliton laser mode locked with a nonlinear mirror", *Optics Letters*, vol. 16, No. 8, Apr. 15, 1991, pp. 539–540.

I.N. Duling et al., "High–Power, Mode–Locked Nd: FIBRE Laser Pumped By An Injection–Locked Array", *Electronics Letters*, Oct. 13, 1988, vol. 24, No. 21, pp. 1333–1334.

I.N. Duling III, "Subpicosecond All–Fibre Erbium Laser", *Electronics Letters*, Mar. 14, 1991, vol. 27, No. 6, pp. 544–545.

M.L. Dennis and I.N. Duling III, "High Repetition Rate Figure Eight Laser With Extracavity Feedback", *Electronic Letters*, Sep. 24, 1992, vol. 28, No. 20, pp. 1894–1896.

R.D. Esman, "Microwave Subcarrier and Clock Recovery by an Optically Injected CPSO", *IEEE Photonics Technology Letters*, vol. 3, No. 2, Feb. 1991, pp. 179–181.

Irl N. Duling III, "Dispersion in rare–earth–doped fibers", *Optics Letters*, vol. 16, No. 24, Dec. 15, 1991, pp. 1947–1948.

(List continued on next page.)

*Primary Examiner*—Wellington Chin
*Assistant Examiner*—Rafael Bacares
*Attorney, Agent, or Firm*—Thomas E. McDonnell

[57] ABSTRACT

A system that uses all optical elements for transmission, regeneration and reception of solitons in point-to-point, broadcast, ring and multi-user trunk type communication systems. Soliton pulses from an optical clock source are modulated by optical data pulses in an optical modulator producing a modulated channel of data pulses. Several channels are combined by an optical multiplexer into a network optical bit stream. This stream is carried by an optical fiber and one or more of optical regenerators which recover the system clock and regenerate the signal with the recovered system clock rather than just amplifying the signal. Each of the regenerators can, in addition to regenerating the data, act as part of a data drop or insert node in a ring network where the node can synchronously remove data from or insert data into the stream. Intermediate nodes can include packet drop/replace nodes if the network is a packet type network. The destination can include an optical demultiplexer which demultiplexes the network stream into the individual channels, an optical clock recovery system that recovers the clock of the system and a receiver that receives the pulses of one of the demultiplexed channels. The system can also include optical logic for decoding and routing optical packets.

9 Claims, 8 Drawing Sheets

OTHER PUBLICATIONS

K. Smith and J.K. Lucek, "All–Optical Signal Regenerator", Conference On Lasers and Electro–Optics, May 2–7, 1993, Baltimore, Maryland.

Morioka et al., "Ultrafast Reflective Optical Kerr Demultiplexer Using Polarisation Rotation Mirror", Electronic Letters, vol. 28, No. 6, Mar. 1996, pp. 521–522.

J.P. Sokoloff et al., "A Terahertz Optical Asymmetric Demultiplexer (TOAD)", IEEE Photonics Technology Letters, vol. 5, No. 7, Jul. 1993, pp. 787–790.

M. Jinno et ano, "Ultrafast all–optical logic operations in a nonlinear Sagnac interferometer with two control beams", 1991, Optics Letters, vol. 16, No. 4 (1991), pp. 220–222.

J.–M. Jeong et ano., "All–optical logic gates based on cross–phase modulation in a nonlinear fiber interferometer", 1991, *Optics Communications* 85, (1991) pp. 430–436.

ULTRA HIGH BIT RATE ALL OPTICAL COMMUNICATION SYSTEM

BACKGROUND OF THE INVENTION

1. Field of the Invention

The present invention relates to an optical communication system designed to operate at an ultra high bit rate and, more particularly, to a system in which all operations are performed by optical devices at speeds too high for conventional electronic components to operate.

2. Description of the Related Art

Current communication systems which include both electrical and optical components operate at bit rates of from 10 megabits per second (Mb/s) to 2.5 gigabits per second (Gb/s). These rates, while sufficient for today's needs, are too slow for the high bit rate traffic data highways planned for the near future. The data highways of the future will require systems capable of bit rates of at least 100 Gb/s with 500 Gb/s a desired goal. Such bit rates are too fast for conventional electronic components. In addition, the data highways need to be capable of operating over transcontinental and transoceanic distances and, thus, need to be capable of transmitting high bit rate solitons.

SUMMARY OF THE INVENTION

It is an object of the this invention to provide a system capable of transmitting data at rates greater than or equal to 100 Gb/s.

It is another object of the present invention to provide a communication system suitable for long distance communication.

It is also an object of the present invention to provide a system in which all components are optical allowing very high bit rates.

It is a further object of the present invention to provide a system capable of transmitting data at rates greater than or equal to 100 Gb/s using commercially available components.

It is an object of the present invention to provide a system that easily and in a straight forward manner scales to higher data rates.

It is an object of the present invention to provide a system that can handle an increased number of channels in a single optical fiber.

It is a still further object of the present invention to provide all optical basic building blocks that can be used to build the various units of a network.

It is another object of the present invention to provide an all optical high speed fiber communication system capable of point-to-point, broadcast, ring or multi-user trunk line type communications.

It is an additional object of the present invention to provide a communication system that reduces soliton phase interaction, dispersion, electrostrictive interaction, Gordon-Haus jitter and self frequency shift.

The above objects can be accomplished by a system that uses all optical elements for transmission, regeneration and reception of solitons. Soliton pulses from an optical source are modulated by an optical modulator producing a modulated channel of pulses. Several such channels are combined by an optical multiplexer into a network stream. This stream is carried by an optical fiber and a series of optical regenerators which regenerate the signal rather than just amplifying the signal. Each of the regenerators can, in addition to regenerating the data, act as part of a data drop or insert node that can synchronously remove data from or insert data into the stream. Intermediate nodes can also comprise packet drop/replace nodes if the network is a packet type network. The destination includes an optical demultiplexer which demultiplexes the network stream into the individual channels, an optical clock recovery system that recovers the system clock and a receiver that receives the pulses of one of the demultiplexed channels. The system can also include optical logic for detecting and routing the optical packets.

These together with other objects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention is a high speed optical communication system that will produce a system clock, modulate, time-division multiplex, transmit, regenerate, and drop/add packets, time-division demultiplex and receive data at bit rates which can be in excess of 100 Gb/s using only optical components. The various functions to be used will depend on the architecture of the communication network in which the present invention is to be used. For example, if a point-to-point configuration is used all the functions except drop and add would be included. If the architecture is a ring type network all the functions would be included.

Figure 1:
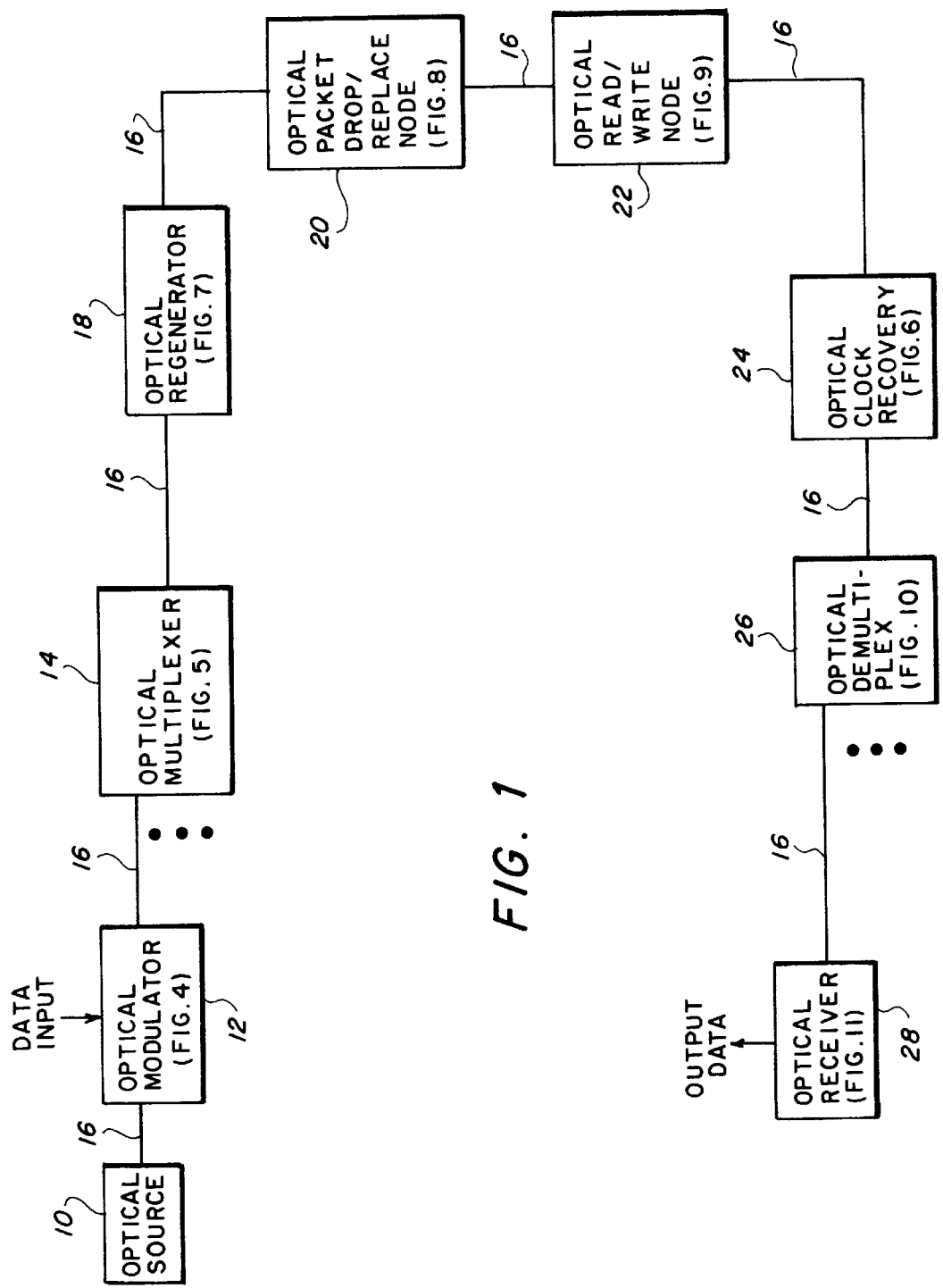
FIG. 1 depicts components that can exist in an all optical communication system according to the present invention.

Referring now to FIG. 1, typical components of a high speed communication system in accordance with the present invention are illustrated. This figure illustrates various components which can be found in a typical system even though all of them might not appear in a particular actual implementation because the particular component is not needed in the particular architecture designed by the user as mentioned above. For example, in a point-to-point topology a multiplexer would be used at the source and a demultiplexer at the destination while in a ring topology all nodes could be packet drop/replace nodes. A typical system includes an optical source 10 capable of generating pulses two picoseconds in width and one-hundred picoseconds apart. The details of the optical source will be discussed further below with respect to FIGS. 2 and 3. The source 10 provides the pulses to an optical modulator 12 which outputs the source pulses responsive to an input data stream producing a single channel of 10 Gb/s optical data. The modulator 12 will be discussed using FIG. 4. The source 10 and modulator 12 act as an all optical transmitter. The single channel is provided, along with ten or more additional channels, to an optical multiplexer 14 described with respect to FIG. 5. The multiplexer 14 combines the channels into a single bit stream which is carried by a conventional single mode optical communications fiber 16, if necessary, to an optical regenerator 18, illustrated in FIG. 7. The regenerator 18 regenerates the optical pulses by recovering the clock and modulating the recovered clock with the data received over the fiber 16, thereby removing any noise and jitter that has been introduced and returning the bit stream to its original strength. This all-optical regenerator 18 typically replaces an optical amplifier in a conventional optical fiber communication system and solves the soliton-soliton interaction, Gordon-Haus jitter and dispersive wave buildup problems typically found in conventional soliton networks. Regenerators 18, although only one is shown, are spaced apart by typically about 40 kilometers. Rather than providing a regenerator 18 the system, in a ring network, can include an optical packet drop/replace node 20 (see FIGS. 1 or 8) which is capable of inserting and removing packets from the bit stream. The node 20 includes optical logic operating at the system clock speed which can identify packets in the data stream and remove or replace them. This optical logic includes optical logic gates, an example of which will be discussed with respect to FIG. 13. As an alternative to both the regenerator 18 or node 20 the system, configured as a ring network, can include an optical read/write node 22 (FIG. 9) which allows data to be read as it passes through the node or new data to be written into the bit stream. At the destination, in the typical point-to-point system, the system includes an optical clock recovery unit 24 (see FIG. 6) which recovers the system clock and a demultiplexer 26 which separates the bit stream into the original channels. The demultiplexer 26 (FIG. 10) is the reverse of the multiplexer. Each single channel is provided to an optical receiver 28 which includes a conventional light detector and which reproduces the original data as electrical signals.

A person of ordinary skill in the art can readily select a suitable pulsed laser optical source 10. The laser source 10 needs a repetition rate of 10 Ghz and a pulse width of 2 picoseconds. The energy (E1) per soliton pulse in a fiber communication system is dictated by the fiber parameters and pulse width. For the typical parameters shown on TABLE 1, where D is the group-velocity dispersion of the optical fiber, $\lambda$ is the wavelength, $n_2$ is the nonlinear index of silica used in the fiber, $A_{eff}$ is the effective area of the fundamental propagating mode of the fiber, $\tau$ is the full pulse width of half maximum, and c is the velocity of light then, as set forth in the equations in TABLE 1 below, the energy per pulse E1 for a 2 picosecond pulse is 2.4 picajoules for an average power of 30 milliwatts. This is typical of the saturation power of conventional Er doped fiber amplifiers.

TABLE 1

$E1=(0.776\ \lambda^3/\pi c n_2)(|D|A_{eff}/\tau)$
$|D|=1$ picosecond/nanometer-kilometer
$\lambda=1.55\ \mu m$
$n_2=3.2*10^{-20}$
$A_{eff}=5.0*10^{-11} cm^2$
$\tau=2$ picoseconds.

Figure 2:
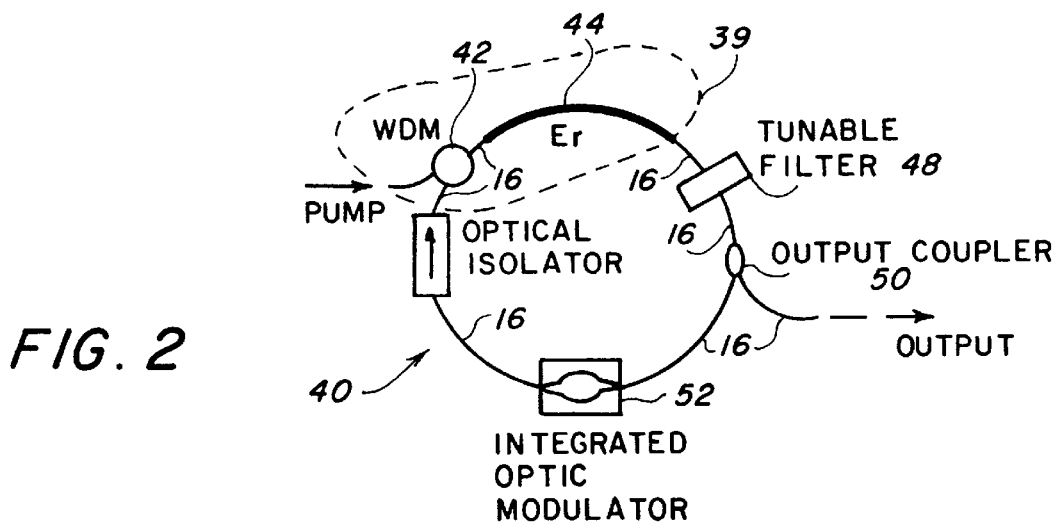
FIGS. 2 and 3 depict soliton sources 10 that can be used in the system of FIG. 1.
Figure 3:
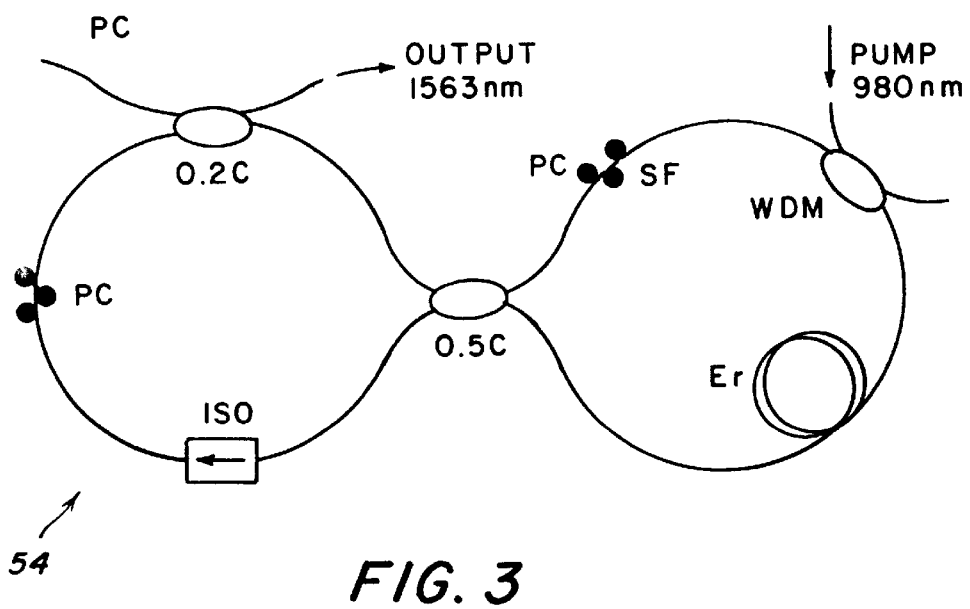

Based on the above parameters the source of the laser pulses could be an amplified gain switched diode or an actively mode-locked fiber laser. FIGS. 2 and 3 illustrate source configurations which would be suitable as the source of soliton pulses.

FIG. 2 depicts an actively mode locked ring fiber laser. The laser includes a conventional optical amplifier 39 available from BT&D as EFA 1401-1550/A3 and that includes a pump source that provides light to a wavelength division multiplexer (WDM) 42 coupled to conventional erbium doped fiber 44. Amplifier 39 is coupled to conventional communications fibers 16, such as type SMF-28 available from Corning, Inc., which is also used to carry the pulses between other ring components. A conventional tunable filter 48 available as model TB2500 Etalon Filter from JDS FITEL provides wavelength stability. A fiber stretcher (not shown) can be used to stabilize the repetition rate if necessary. A conventional fiber output coupler 50, available from Aster and designated SMC-15-20-1-A-1 (DS)-S, is used to output the soliton pulses to the optical modulator 12. An integrated optic modulator 52, available from Etek and designated MEOM0 1550-MZ-10, is coupled to the coupler 50. The last component in the ring is a conventional optical isolator 54, available as Model IO-PMI-IRI-F from Optics For Research.

Referring now to FIG. 3, a conventional figure eight laser source configuration that also uses conventional components is shown. The details of this figure eight configuration are described in U.S. Pat. No. 5,050,183 incorporated by reference herein.

Figure 4:
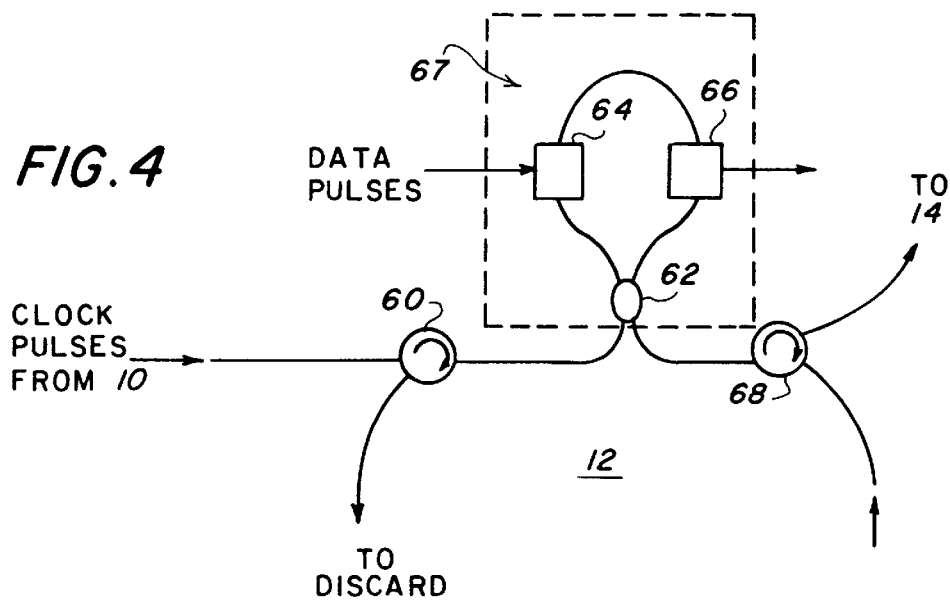
FIG. 4 illustrates the components of an optical modulator 12 in accordance with the present invention.

Referring now to FIG. 4, the components of an optical modulator 12 that can also function as an optical two channel multiplexer performing the functions of the devices 12 and 14 of FIG. 1 are shown. When functioning as a modulator clock pulses from the source 10 enter through a conventional communications fiber and are provided to a conventional optical circulator 60 available from JDS FITEL or Micron Optics. The pulses from the circulator 60 travel to a conventional 3 dB beam splitter-combiner coupler 62 which splits the beam into two counter rotating beams. That is, one part of the beam goes up to the right and the other goes up to the left. The beams are provided to conventional couplers 64 and 66. As in the source 10 of FIG. 1 illustrated in FIG. 2, these couplers 64 and 66 can be conventional wavelength division multiplexers (WDM) available from JDS-FITEL or conventional polarization beam splitters. Coupler 64 also receives the stream of optical input data. This data could be generated in any number of ways known to persons of ordinary skill in the art, one of which would be by a gain switched laser diode. As the data pulse co-propagates with the clockwise travelling clock pulse (in FIG. 4), that portion of the clock pulse accumulates a phase shift through cross phase modulation. When the clockwise and counterclockwise pulses recombine at coupler 62 the accumulated phase shift will cause the clock pulse to exit toward circulator 68 and out port "TO 14" and nonswitched pulses exit toward circulator 60 and "TO DISCARD". If the fiber loop mirror 67 of FIG. 4 is used only as a modulator (encoder) the modulated soliton pulses from optical circulator 68 are provided to the optical multiplexer 14.

If the mirror 67 is also to be used for optical time-division multiplexing, a stream of modulated pulses to be multiplexed with the pulses modulated by the mirror 67 is provided to a second conventional optical circulator 68. The two modulated pulse streams are combined by the mirror 67 and return to the circulator 68 to be output. During multiplex operation pulses arriving at the loop mirror from a previous channel are reflected from the mirror and exit through optical circulator 68 "TO 14". The non-encoded bit stream (the clock) for the current channel arrives at the loop mirror through the conjugate port and without a coincident switching pulse is reflected from the mirror and dumped by circulator 60. If a "1" is desired in the bit for the current channel a switching pulse will arrive coincident with a pulse from the input stream. Cross-phase modulation of the signal pulse by the switching pulse will cause the signal pulse to be transmitted through the mirror to circulator 68. With the appropriate timing the pulse will be placed in the location for the next bit of the current channel.

Another example of an all-optical modulator suitable for use as modulator 12 of FIG. 1 in the all-optical component system of the present invention can use Kerr nonlinearity in a polarization rotating mirror to effect the switching as described in Morioka et al., Electronic Letters, Vol. 28, 1992, pages 521–522.

Figure 8:
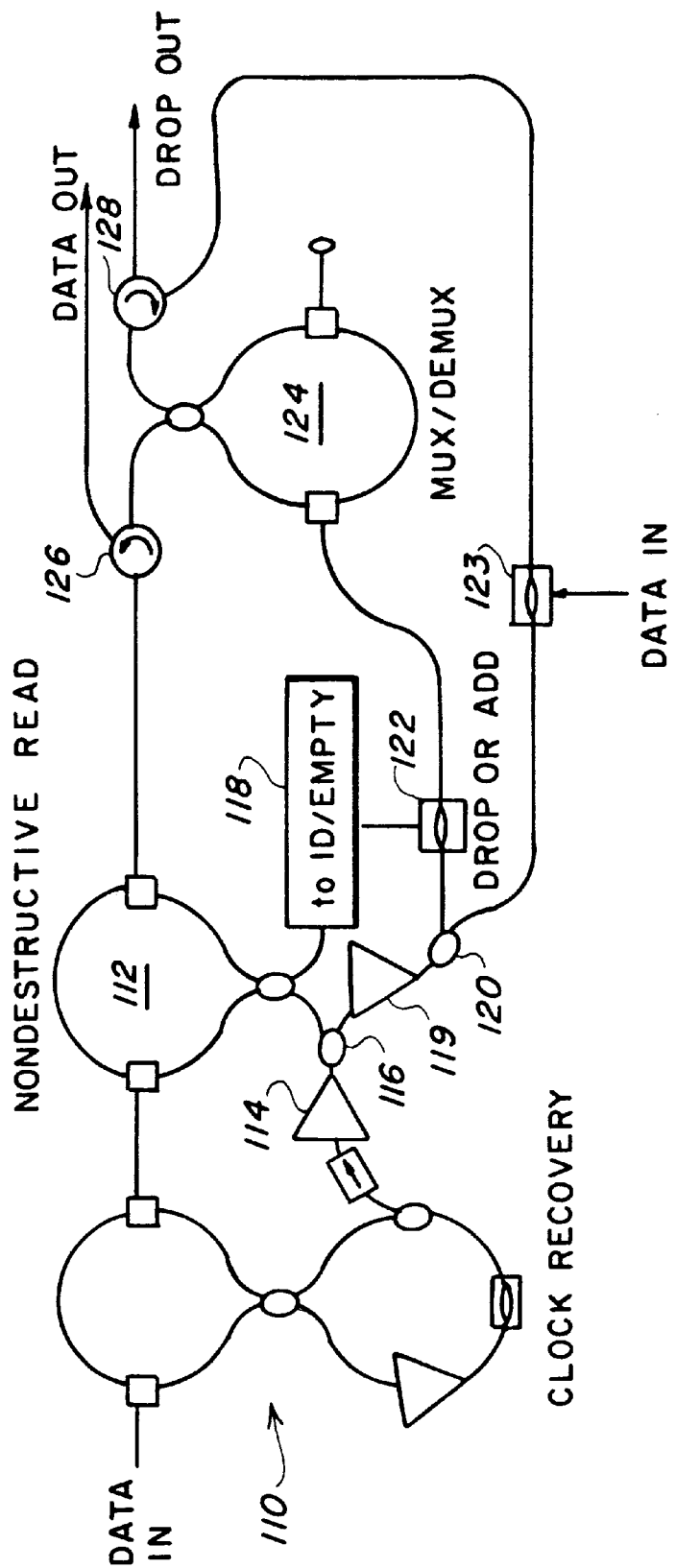
FIG. 8 is a packet node 20 that can drop or insert a packet responsive to a packet address.
Figure 9:
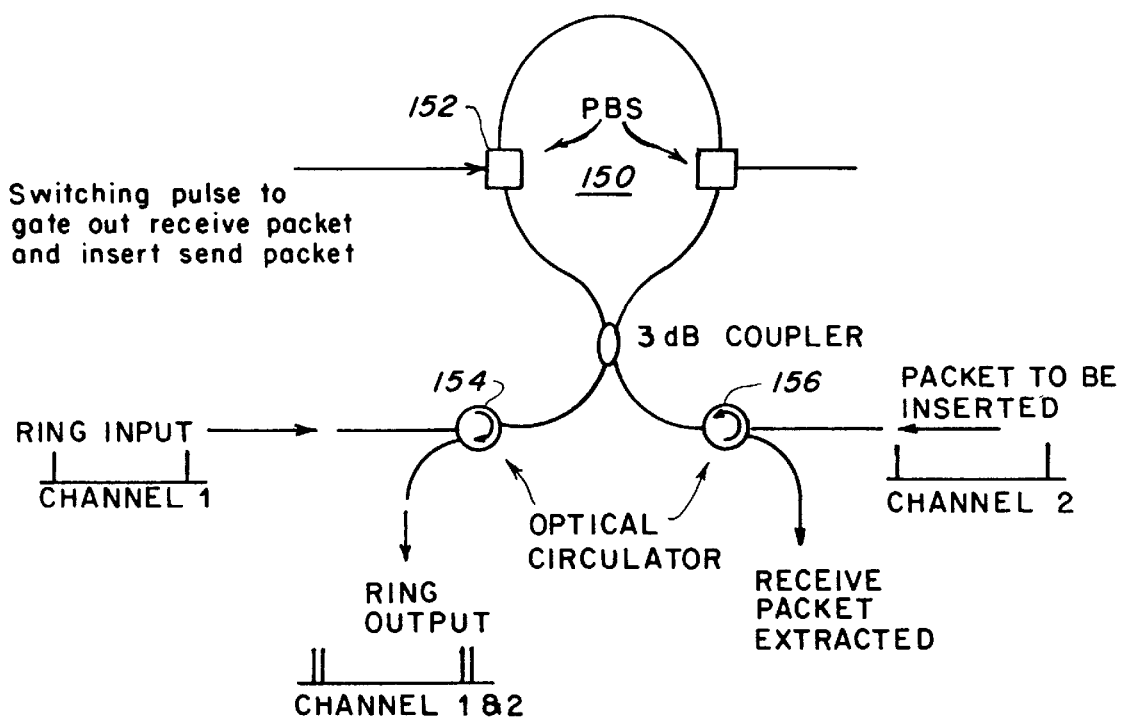
FIG. 9 shows an optical read/write node 22.

The all-optical modulator of FIG. 4 can also be used as a packet drop/replace node (see FIG. 8) or as an optical read/write node (see FIG. 9).

Figure 5:
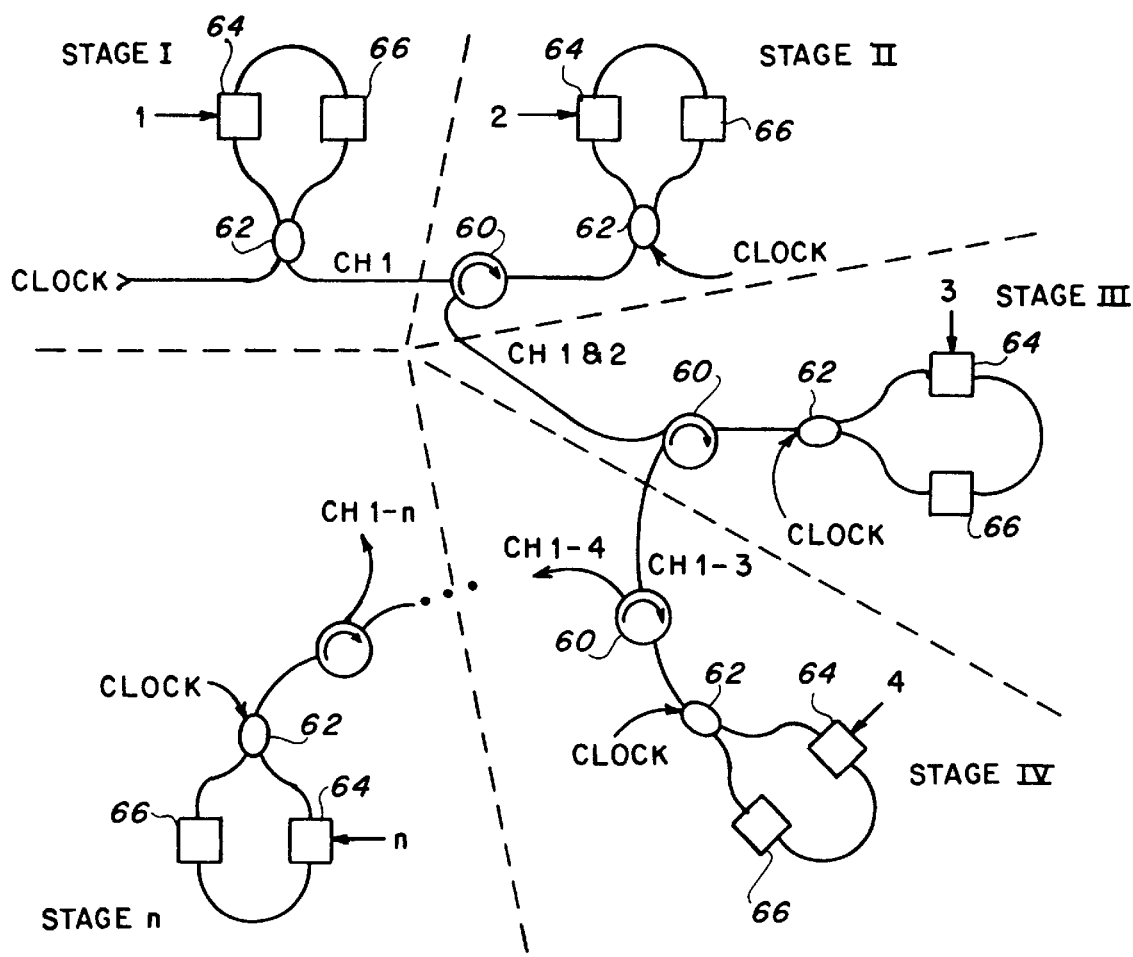
FIG. 5 shows the stages of an optical multiplexer 14.

Referring now to FIG. 5, an appropriate number of pulse streams can be combined by extending the multiplexing illustrated in FIG. 4 as shown by the multiplexer 14. In this figure, as in FIG. 4, in each subsequent stage an optical circulator 60 provides the clock stream to be encoded and combined with pulses from previous channels to a loop mirror for that stage where the mirror multiplexes and encodes the system clock using the channel data. Because each stage is referenced to the system clock, the insert timing at each stage can be synchronized. In the first stage I channel 1 data input to modulator 64 switches the clock input to the coupler 62. Coupler 62 outputs the channel 1 data to the circulator 60 of the second stage II. The second stage multiplexes channel 1 with channel 2. Stage III combines multiplexed channels 1 and 2 with channel 3. Stage IV multiplexes channel 4 with channels 1–3. Stage n adds channel n data resulting in a multiplexed pulse stream of channels 1–n. With the pulse width and pulse rate previously described, 10 channels can be multiplexed onto a single communications fiber. The number of channels can of course be readily adjusted by a person of ordinary skill.

For the sake of brevity the remaining units will be described in an order which allows ease of understanding since various units are constructed from combinations of units which will have been previously described. For example, the optical regenerator 18 (FIG. 7) is comprised of a clock recovery unit 24 and a mirror 67 while a packet node includes a regenerator 18 and a multiplexer/demultiplexer 14/26.

Figure 6:
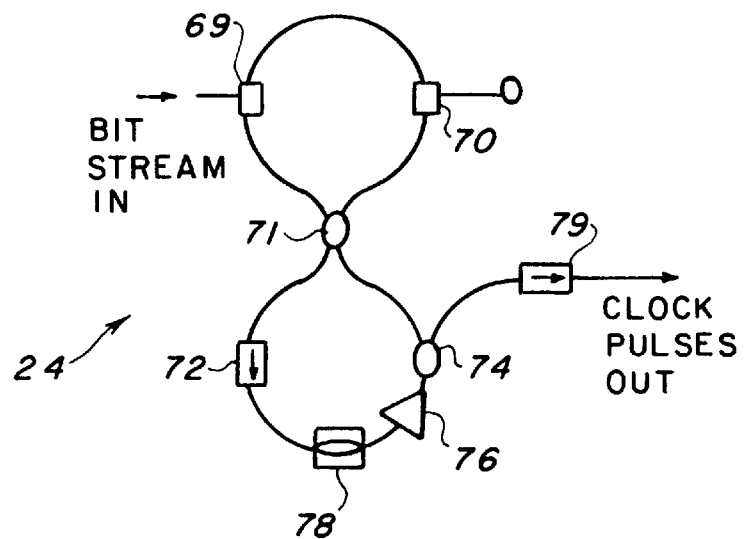
FIG. 6 illustrates a figure eight laser being used as an optical clock recovery unit 24.

Referring now to FIG. 6, an all optical clock recovery unit 24 is shown. The clock recovery unit 24, as can be seen by comparing FIG. 3 to FIG. 6, is basically a driven figure eight laser which includes two conventional WDM couplers 69 and 70 where the coupler 69 receives the input bit stream while the coupler 70 discards the data pulses used to recover the clock and 3 dB a conventional coupler/splitter 71, as described with respect to devices 62, 64 and 66 of FIG. 4. The upper half of FIG. 6 operates as an all optical switch similar to that in FIG. 4. A pulse arriving from the bit stream allows light entering the loop mirror from the isolator 72 to pass through the loop mirror toward coupler 74. After passing through coupler 74 the light is amplified in a conventional amplifier 76, such as the 1401 from BT&D. This establishes a pulse at that position in the clock stream which is then self-sustaining. By averaging over the entire randomly coded bit stream, a fully recovered clock stream can be generated. The amplifier 76 provides the pulses to an optional conventional optical modulator 78 such as that designated previously. The recovered clock pulses exit from the coupler/combiner 74 and pass through an optical isolator 79 before being output.

Figure 7:
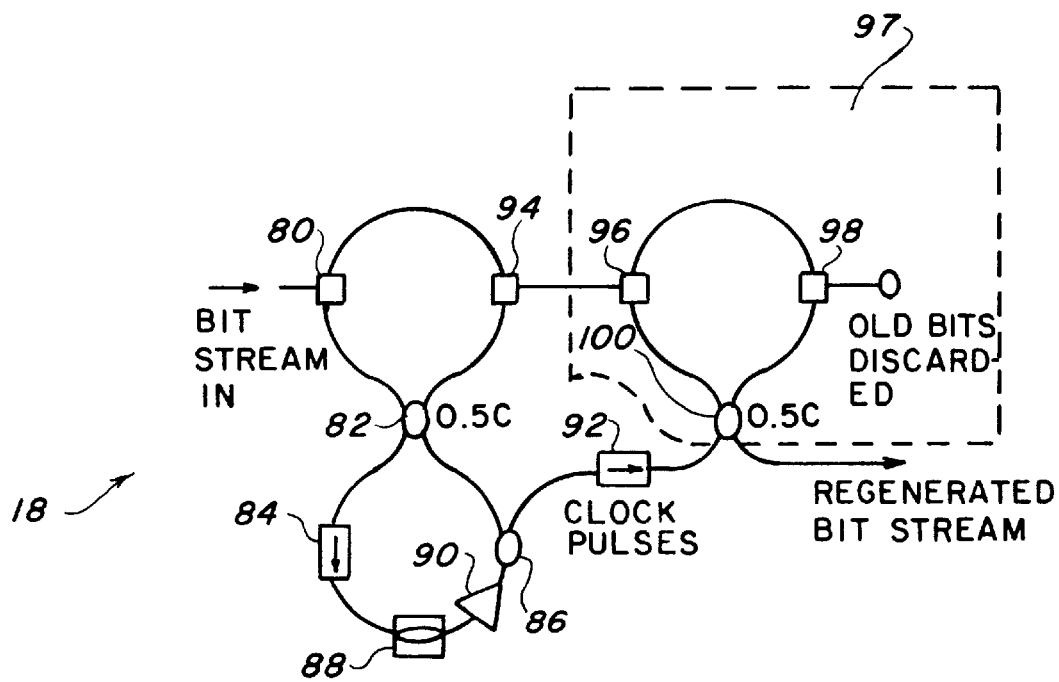
FIG. 7 depicts an all optical regenerator 18 that removes jitter while regenerating the data pulse stream.

Referring now to FIG. 7, the components of an optical regenerator 18 suitable for use in the all optical system described herein are shown. This device, like the devices previously described uses conventional components such as those models previously designated. The regenerator 18 is essentially a fiber laser, as in FIGS. 3 and 6 previously discussed, which is mode locked by the input bit stream to recover the clock signal and the original bit stream is used to drive a loop mirror encoder (essentially as described with respect to FIG. 4) to transfer the information from the original jittery bit stream to the derived clock coming from the modelocked laser. In this way each repeater becomes a regenerator with no loss of speed, reduced jitter and a significant increase in signal fidelity. The output of the clock recovery circuit, which is the left side of FIG. 7 (compare to FIG. 6) exits the structure through coupler 86 towards isolator 92. The clock stream proceeds to be modulated by loop mirror 97 comprising coupler 100 and WDM (or polarization couplers) 96 and 98 and their connecting fiber. The original bit stream is output by a wavelength division multiplexer or polarization beam coupler 94 of the laser to a WDM 96 of the mirror 97. The mirror 97, like those in FIGS. 4 and 6, also includes a coupler 98 which discards the old bits and a coupler 100 which outputs the regenerated bit stream.

Another all optical signal regenerator suitable for use in the system of the present invention is described in Smith et al, All-Optical Signal Regenerator, Conference On Lasers And Electro-Optics, Baltimore, Md., May 2–7, 1993, CPD23-1/46-47.

Whenever the system is configured as a ring type packet communication system, such as in a ring network, a packet drop/replace node 20, as illustrated in FIG. 8, can be used. Note that a ring of such nodes would require one node dedicated to placing the system clock on the ring. This unit 20 (FIG. 1) comprises a clock recovery unit 110, as previously described, with the recovered clock being provided to a loop mirror 112, as previously described, through a conventional amplifier 114 and a conventional coupler/combiner 116. The data is provided to the loop mirror 112 in the loop ring just as in the regenerator discussed with respect to FIG. 7. The data output of the loop mirror 112 is provided to an identification unit 118 that evaluates the packet header for the packet address using all optical logic circuits, an example of which will be described in more detail further below with respect to FIG. 13. The recovered clock is amplified by conventional optical amplifier 119 and split by coupler 120. The identification evaluation unit 118 provides an electrical data control signal to a conventional optical modulator 122 that allows the clock to be applied to a conventional loop mirror 124. The control signal which initiates the modulation of the clock signal also initiates the modulation of the clock signal from coupler 120 with data to be added to the bit stream in an add operation in modulator 123. The loop mirror 124 is supplied with the optical bit data stream by a conventional circulator 126 which also produces the output optical bit stream transmitted to the next node. The reproduced clock now modulated by the input data is also provided to a second optical circulator 128 and the circulator 128 provides the dropped output data to a receiver which converts the optical pulses into electrical signals using a conventional optical detector. The nondestructive reading capability of this node allows point-to-point as well as broadcast communication in which any of the time slots provided on the network can be addressed. During operation of this packet node 20, changing the phase (timing) of the clock signal allows examination of a different one of the multiplexed channels. In this way a node receiver can scan the channels looking for a packet address designating that node. If for some reason a packet addressed to the node 20 is on a different channel, the packet will continue to circulate in the ring network until the channel scan moves to the proper channel and the packet is detected. It is then examined or dropped. If transmission of new data is required the node will scan for an empty channel/packet location and insert the data to be transmitted. In this way, asynchronous burst mode operation is possible. The ability to interrogate the channels using cross phase modulation allows a nondestructive read as a packet passes the node 20, thereby allowing any number of users to access the same data channel at effectively the same time.

FIG. 9 depicts an optical read/write node 22. This unit is essentially a loop mirror and is substantially identical to the optical circuit of FIG. 4. However, to function as such a node the data inputs and outputs are different. This node 22 is driven by a switching pulse input through the WDM or polarization beam coupler 152 and causes each packet entering the mirror 150 through the conventional optical circulator 154 to be output through conventional circulator 156. At the same time that a packet is being switched out a replacement packet enters the mirror 150 through circulator 156 and is output to the network ring by circulator 154.

Figure 10:
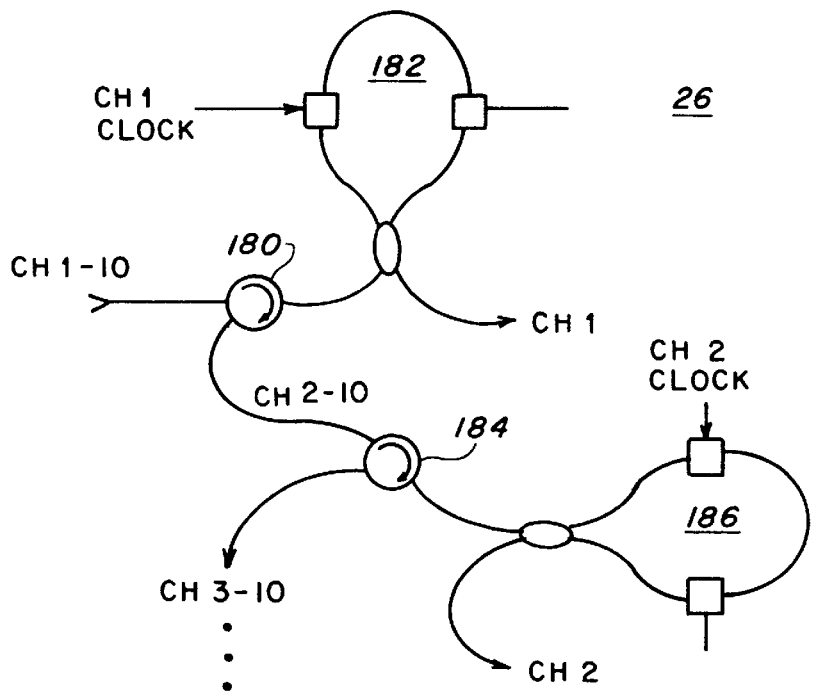
FIG. 10 illustrates two of the stages of a ten stage demultiplexer 26.

Referring now to FIG. 10, the details of the optical demultiplexer 26 of FIG. 1 are shown. In this unit the multiplexed optical bit stream is provided to a conventional optical circulator 180 that provides the bit stream to a first optical loop mirror 182 driven by a clock signal for channel one. This is a channel clock signal that has been down converted. The mirror 182 separates out the first channel, produces a first channel output and sends the bit stream containing the second through tenth channels to the next stage by passing them out through the circulator 180. The remaining channels are then provided to a second circulator 184 that provides the second through tenth channels to a second loop mirror 186 which with the second channel clock strips out the second channel passing the third through tenth channels on to the next stage. This process continues until all of the channels have been separated out.

It is well within the skill of a person of ordinary skill in the art to organize the demultiplexer of FIG. 10 into a tree structure rather than as a serial configuration as shown in FIG. 10. The advantage of the serial structure is that there is only one clock rate required, while in a tree structure demultiplexing clocks would be required at 10, 20, 40 Gb/sec, etc. The advantage of the tree structure is that the loss for all of the channels is approximately equal while in the serial configuration the first channel will only see the loss of one loop mirror while the tenth channel will have seen 10 times that loss.

Figure 11:
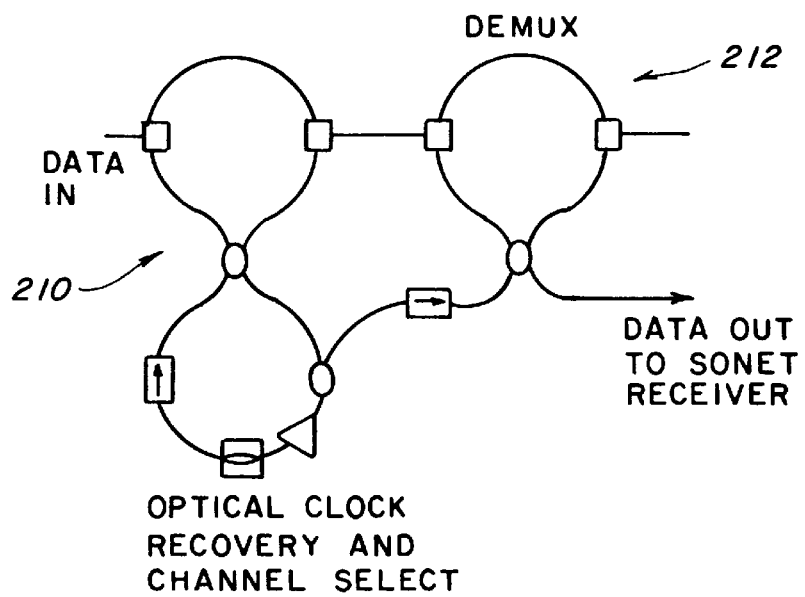
FIG. 11 shows a single channel receiver.

Referring now to FIG. 11, a single channel optical receiver which comprises a channel clock recovery unit 210, as previously described, and an optical demultiplexer 212 as also previously described is shown. The output optical bit stream is provided to a conventional SONET receiver for conversion to an electrical signal.

Figure 12:
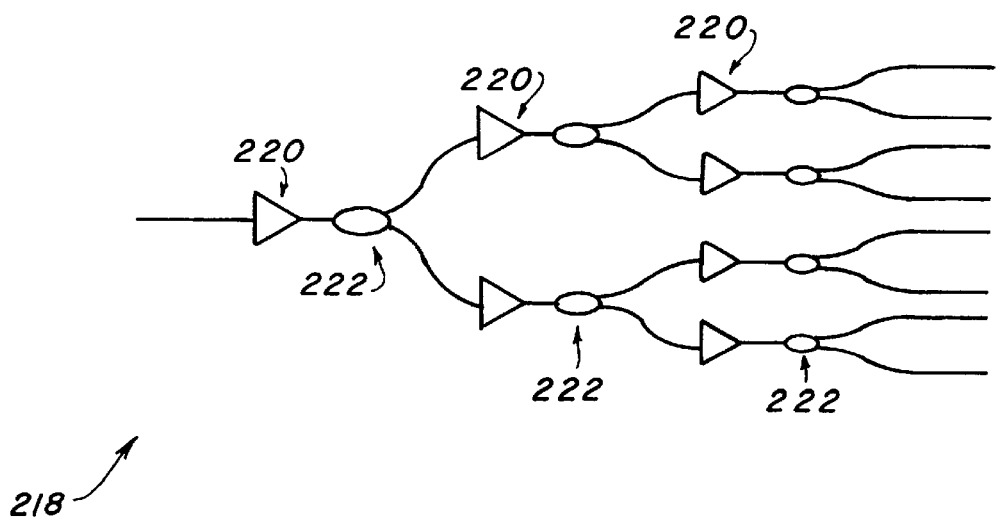
FIG. 12 depicts a distribution unit for producing multiple soliton pulses from a single source.

Referring now to FIG. 12, an arrangement is shown in which the multiple channel clocks needed for both the multiplexer and demultiplexer can be provided. A ring laser operating as a pulse source produces pulses at the channel rate. The clock distribution unit 218 includes multiple conventional optical amplifiers 220 and multiple conventional 3 dB couplers 222 that split the single clock signal into multiple clock signals. To provide the necessary phase delay for the clock of each channel, each output of the tree shown in is provided to a corresponding conventional fiber stretcher comprising a length of fiber wrapped around a conventional piezoelectric cylinder (not shown). The fiber for each channel is stretched by a different amount, up to 100 picoseconds, producing a different phase delay for each channel. Rather than operate a ring or figure eight laser at the system clock rate, the system clock can be produced by combining channel clocks at different phases produced by unit 218 after modulation into a single bit stream with couplers and optical amplifiers in a configuration mirroring that of unit 218. The 100 Gb/s stream can be produced in a similar manner by placing optical modulators at the point where all of the channels have been separated prior to recombining.

Figure 13:
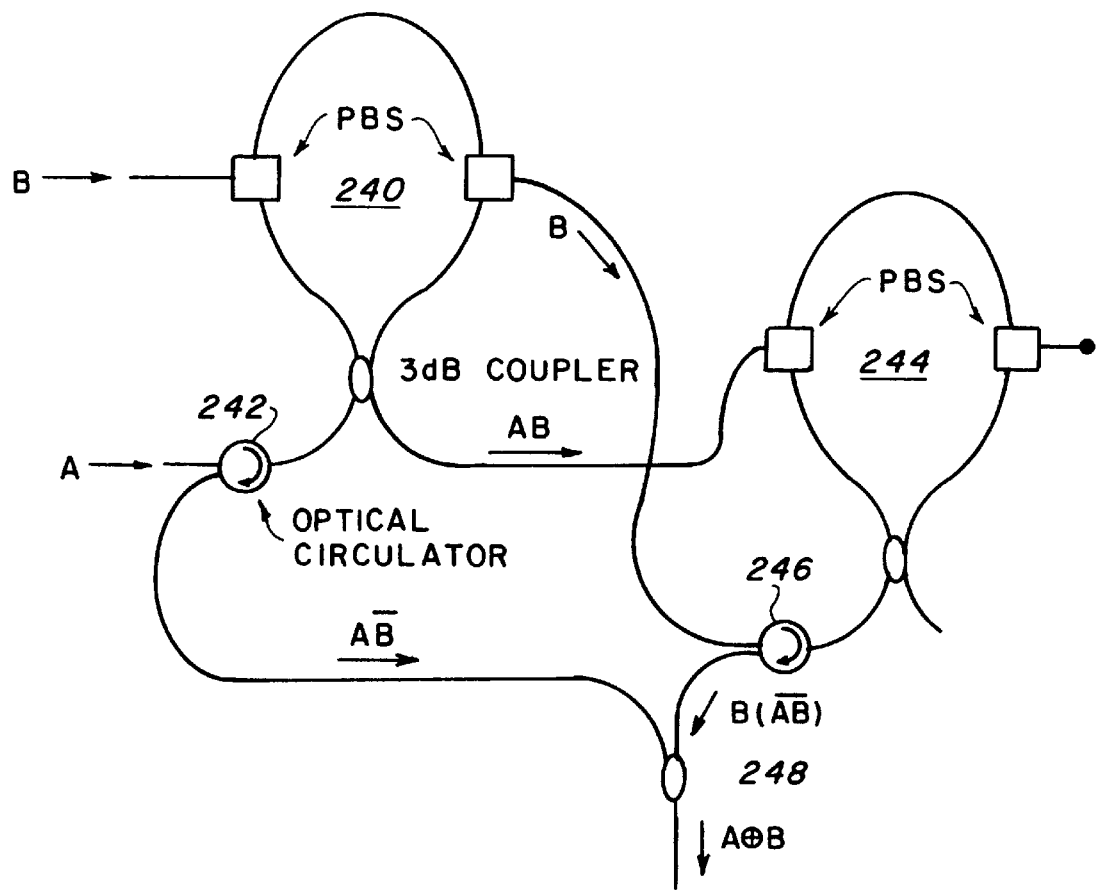
FIG. 13 illustrates an all optical XOR logic unit for determining packet ID.

The channel identification unit 118 of FIG. 8, depending on the particular architecture, channel allocation and data format selected, can include a conventional light detector that determines whether data exists in the packet header by detecting the existence of any "one" in the packet address, along with one or more exclusive-or (XOR) circuits that compare a packet identifier to a node address and produces a control signal when a match occurs. Referring now to FIG. 13, such an optical XOR unit is shown. One of the inputs (B) to be compared is provided to a polarization beam coupler or WDM of a first loop mirror 240 and the other input (A) is provided to an optical circulator 242. The mirror 240 outputs the B signal as well as AB while the circulator 242 outputs the A$\overline{B}$ signal. The AB signal is provided as the drive to a second loop mirror 244 while the B signal is provided to the mirror 244 through a second circulator 246. The circulator 246 produces the B($\overline{AB}$) signal which is combined with the A$\overline{B}$ signal by a 3 dB coupler 248 to produce the exclusive-OR output. With this optical XOR circuit any logic necessary for identifying a packet header can be produced.

The present invention has been described with respect to using a nonlinear optical loop mirror as the primary switching element. It is possible though less desirable to use a soliton dragging logic gate instead of the mirror. A temporal optical amplifier multiplexer, as described in TOAD-Terahertz Optical Asymmetric Demultiplexer, IEEE Photonics Technology Letters, vol. 15, 1993 pages 787–790, or a loop mirror with an integral GaAs waveguide or other highly nonlinear medium can be used in the present invention to enhance cross phase modulation.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An optical communication system for receiving optical data pulses, comprising:

an optical transmitter for modulating optical clock pulses with the data pulses; and an optical receiver coupled to said transmitters for recovering the clock pulses and outputting the optical data pulses;

an optical regenerator for recovering the optical clock pulses and modulating the optical clock pulses with the optical data pulses; and a optical communications fiber coupled between said optical generator and said receiver;

an optical multiplexer for multiplexing plural optical data channels and coupled between said transmitter and said optical communications fiber; and an optical demultiplexer for demultiplexing the optical data channels and coupled between said second optical communications fiber and said receiver;

wherein said optical multiplexer comprises plural serially coupled stages, each stage comprising an optical mirror for combining a switch clock signal with a channel of optical channel data and producing a corresponding multiplexed channel.

2. An optical communication system comprising:

an optical transmitter for modulating optical clock pulses with optical data pulses;

an optical communications fiber coupled between said transmitter and an optical regenerator, said optical regenerator for recovering said optical clock pulses and modulating said optical clock pulses with said optical data pulses;

an optical communications fiber coupled between said regenerator and optical clock recovery unit;

wherein said optical clock recover unit comprises a figure eight laser driven by said optical data pulses;

an optical communications fiber coupled between said clock recovery unit and an optical receiver for recovering said clock pulses and outputting said optical data pulses.

3. An optical communication system comprising:

an optical transmitter for modulating optical clock pulses with optical data pulses;

an optical communications fiber coupled between said transmitter and an optical regenerator; said optical regenerator for recovering said optical clock pulses and modulating said optical clock pulses with said optical data pulses;

wherein said optical regenerator comprises;

an optical loop mirror for switching said recovered optical data pulses; and an optical clock recovery unit driven by said optical data pulses for recovering said optical clock pulses, wherein said optical clock recovery unit comprises a figure eight laser driven by said optical data pulse, an optical communications fiber coupled between said regenerator and said optical clock recovery unit, an optical communications fiber coupled between said clock recovery unit and said optical receiver for recovering said clock pulses and outputting said optical data pulses.

4. An optical communication system for receiving optical data pulses, comprising:

an optical transmitter for modulating optical clock pulses with the data pulses; and an optical receiver coupled to said transmitter, for recovering the clock pulses and outputting the optical data pulses;

an optical packet node coupled between said transmitter and said receiver and comprising:
  an optical clock recovery unit coupled for receiving the optical data pulses for producing a recovered clock;
  a loop mirror coupled to said recovery unit for receiving the recovered optical clock pulses and regenerating the data pulses;
  a first optical modulator coupled to said recovery unit; and
  an optical multiplexer/demultiplexer coupled to said loop mirror, said modulator and said clock recovery unit.

5. An optical communication system for receiving optical data pulses, comprising:

an optical transmitter for modulating optical clock pulses with said optical data pulses;

an optical receiver for recovering said optical clock pulses and outputting said optical data pulses;

an optical regenerator for recovering said optical clock pulses and modulating said optical clock pulses with said optical data pulses, said optical regenerator coupled to said optical receiver by a first optical communications fiber; and a second optical communications fiber coupled between said optical regenerator and said transmitter;

wherein said first and second optical communication fibers carry serial single color light pulses at no less than to one-hundred billion pulses per second.

6. An optical exclusive-OR logic circuit, comprising:

a first loop mirror for receiving a first optical data signal;

an optical circulator coupled to said first loop mirror for receiving a second optical data signal;

a second loop mirror coupled to said first loop mirror;

a second circulator coupled to said first and second loop mirrors; and a coupler coupled to said first and second circulators for producing an optical exclusive or output of the first and second data signals.

7. The system of claim 4 further comprising:

an optical multiplexer for multiplexing plural optical data channels each having a packet identifier;

an identification unit coupled to said recovery unit for comparing the packet identifier with a preselected channel to provide a binary identification signal; and a second modulator coupled to said identification unit and said optical multiplexer, said second modulator being responsive to the identification signal.

8. The system of claim 7, said identification unit further comprising an optical exclusive-OR logic circuit.

9. The system of claim 8, said optical exclusive-OR logic circuit further comprising:

a first loop mirror for receiving a first optical data signal;

an optical circulator coupled to said first loop mirror for receiving a second optical data signal;

a second loop mirror coupled to said first loop mirror;

a second circulator coupled to said first and second loop mirrors; and a coupler coupled to said first and second circulators for producing an optical exclusive or output of the first and second data signals.

* * * * *